(12) United States Patent
Thetford et al.

(10) Patent No.: US 8,167,992 B2
(45) Date of Patent: May 1, 2012

(54) DISPERSANT AND COMPOSITIONS THEREOF

(75) Inventors: Dean Thetford, Norden (GB); Patrick J. Sunderland, Rossendale (GB); Neil L. Simpson, Oldham (GB)

(73) Assignee: Lubrizol Limited, Hazelwood, Derby (GB)

(*) Notice: Subject to any disclaimer, the term of this patent is extended or adjusted under 35 U.S.C. 154(b) by 0 days.

(21) Appl. No.: 12/097,286

(22) PCT Filed: Dec. 14, 2006

(86) PCT No.: PCT/US2006/062061
§ 371 (c)(1),
(2), (4) Date: Oct. 28, 2008

(87) PCT Pub. No.: WO2007/102911
PCT Pub. Date: Sep. 13, 2007

(65) Prior Publication Data
US 2009/0093569 A1    Apr. 9, 2009

Related U.S. Application Data

(60) Provisional application No. 60/750,479, filed on Dec. 15, 2005.

(51) Int. Cl.
*C09D 11/00* (2006.01)
(52) U.S. Cl. .............. 106/31.86; 106/31.13; 106/31.6; 524/80; 524/81; 524/401; 525/410; 525/523; 528/391; 528/399; 528/403; 528/417; 528/419; 528/421; 528/422; 528/425
(58) Field of Classification Search .......... 524/80, 524/81, 401; 525/410, 523; 528/391, 399, 528/403, 417, 419, 421, 422, 425; 106/31.13, 106/31.6, 31.86
See application file for complete search history.

(56) References Cited

U.S. PATENT DOCUMENTS

| 5,879,445 | A | 3/1999 | Guicquero et al. |
| 5,914,072 | A | 6/1999 | Zirnstein et al. |
| 2004/0050288 | A1* | 3/2004 | Geary et al. ............ 106/31.01 |
| 2005/0020735 | A1 | 1/2005 | Krappe et al. |
| 2005/0227877 | A1* | 10/2005 | Wo et al. .................. 508/345 |

FOREIGN PATENT DOCUMENTS

| DE | 19529242 A1 | 2/1997 |
| EP | 0961803 A1 | 12/1999 |
| EP | 1486524 A1 | 5/2004 |
| FR | 2696736 A1 | 4/1994 |
| FR | 2759704 A1 | 8/1998 |
| WO | 2005010109 A2 | 2/2005 |

OTHER PUBLICATIONS

Huntsman, Amine Applications and Properties Data, 2005, p. 1-8 [online], accessed via the Internet [retrieved on Feb. 25, 2010], URL: <http://193.221.91.170/performance_products/Media/Amine_Apps_&_Properties_Data.pdf>.*
Huntsman, Amine Applications and Properties Data, 2003, p. 1-8 [online], accessed via the Internet [retrieved on Oct. 22, 2010], <http://web.archive.org/web/20051014084425/www.huntsman.com/performance_products/Media/Amine_Apps_&_Properties_Data.pdf>.*
Huntsman, The Jeffamine® Polyoxyalkyleneamines, 2002, p. 1-6.*

* cited by examiner

*Primary Examiner* — David W Wu
*Assistant Examiner* — Robert Jones, Jr.
(74) *Attorney, Agent, or Firm* — Samuel B. Laferty

(57) ABSTRACT

A composition comprising a particulate Solid, an organic medium and a compound with an alkyleneoxy compound with an inorganic acidic polar head group (Z), wherein the compound is defined by Formula (1) and salts thereof: U—$(Y)_x$-T-N(G)$_r$(B—Z)$_q$ (Formula 1) wherein U is independently R'—N—(C)-T'-O—, or R—O—; R or R' may be the same or different and are independently H or $C_{1-50}$-optionally substituted hydrocarbyl, or hydrocarbonyl group (acyl group), or the residue of an epoxide, or the residue of an optionally substituted (meth) acrylic ester or amide group; Y is $C_{2-4}$-alkyleneoxy; T or T' is independently $C_{2-4}$ alkylene; B is an alkylene group, such as, methylene; Z is an inorganic acidic polar head group, such as, a sulphur or phosphorus acidic polar head group; G and G' may be the same or different and are independently H or $C_{1-50}$-optionally substituted hydrocarbyl or $C_{1-50}$-optionally substituted hydrocarbyl or hydrocarbonyl group or the residue of an epoxide, or the residue of an optionally substituted (meth) acrylic ester or amide group; r is zero or 1; q is 1 or 2, with the proviso that when q is 2, r is zero; and x is from 2 to 90.

6 Claims, No Drawings

DISPERSANT AND COMPOSITIONS THEREOF

CROSS REFERENCE TO RELATED APPLICATION

This application claims priority from PCT Application Serial No. PCT/US2006/62061 filed on Dec. 14, 2006, which claims the benefit of U.S. Provisional Application No. 60/750,479 filed on Dec. 15, 2005.

FIELD OF INVENTION

The present invention relates to compositions comprising a particulate solid, an organic medium and/or water and a compound comprising an alkyleneoxy with an inorganic acidic polar head group. The invention further relates to the use in inks, millbases, plastics and paints of the composition. The invention further relates to novel dispersants.

BACKGROUND OF THE INVENTION

Dispersants containing terminal acidic groups, such as, phosphates and sulphates are known, and are generally, prepared by reaction of a hydroxy ended polymer chain with phosphorus pentoxide, phosphorus oxychloride, polyphosphoric acid or sulphuric acid. The dispersant polymer chains are often derived from polyester or polyalkoxylate chains containing terminal hydroxyl groups. Dispersants known in the art containing terminal acidic groups are suitable for a polar medium, such as, water, ketones, esters and the like. However, it would be advantageous to utilise the dispersant properties of compounds containing terminal acidic groups in both a polar and a non-polar organic medium. The present invention provides such a dispersant and compositions thereof.

U.S. Pat. No. 5,300,255 discloses dispersants containing a polyester derived from a hydroxycarboxylic acid with not more than 8 carbon atoms reacted with phosphorus pentoxide or sulphuric acid. The dispersants are effective in polar medium such as aromatic solvents and plastics.

U.S. Pat. No. 5,130,463 discloses dispersants of a polyether/polyester derived from ε-caprolactone reacted with polyphosphoric acid. The dispersants are effective in more polar medium, such as, ketones and esters.

U.S. Pat. No. 5,879,445 discloses a process for fluidizing an aqueous suspension of mineral particles with compounds based on polyether amine methylene phosphonates, i.e., water based Jeffamine mono- and bis-methylene phosphonates. The polyether chain consists mainly of ethylene oxide (EO) and propylene oxide (PO).

European Patent Application 961803 discloses similar compounds to U.S. Pat. No. 5,879,445, except EP961803 further discloses the use of polyether amine methylene phosphonates as dispersants for dispersing carbon black in an aqueous medium.

SUMMARY OF THE INVENTION

It has been found that certain dispersants show excellent ability to disperse a particulate solid in a range of organic media, particularly polar organic media and including water. Thus, one embodiment of the present invention provides a composition comprising a particulate solid, an organic medium and a compound with an alkyleneoxy compound with an inorganic acidic polar head group (Z), wherein the compound is defined by Formula (1) and salts thereof:

$$U—(Y)_x\text{-}T\text{-}N(G)_r\text{-}(B—Z)_q \qquad \text{(Formula 1)}$$

wherein
U is independently
R'—N-(G')-T'-O—, or
R—O—;
R or R' may be the same or different and are independently H or $C_{1\text{-}50}$-optionally substituted hydrocarbyl, or hydrocarbonyl group (acyl group), or the residue of an epoxide, or the residue of an optionally substituted (meth) acrylic ester or amide group;
Y is $C_{2\text{-}4}$-alkyleneoxy;
T or T' is independently $C_{2\text{-}4}$ alkylene;
B is an alkylene group, such as, methylene;
Z is an inorganic acidic polar head group, such as, a sulphur or phosphorus acidic polar head group;
G and G' may be the same or different and are independently H or $C_{1\text{-}50}$-optionally substituted hydrocarbyl or $C_{1\text{-}50}$-optionally substituted hydrocarbyl or hydrocarbonyl group or the residue of an epoxide, or the residue of an optionally substituted (meth) acrylic ester or amide group;
r is zero or 1;
q is 1 or 2, with the proviso that when q is 2, r is zero; and
x is from 2 to 90.

In one embodiment, the invention provides a compound with an alkyleneoxy compound with an inorganic acidic polar head group (Z), wherein the compound is defined by Formula (1) and salts thereof:

$$U—(Y)_x\text{-}T\text{-}N(G)_r\text{-}(B—Z)_q \qquad \text{(Formula 1)}$$

wherein the variables of Formula (1) are described herein above.

In one embodiment of the present invention provides a composition comprising a particulate solid, an organic medium, and a compound with an alkyleneoxy compound with an inorganic acidic polar head group (Z), wherein the compound is defined by Formula (1a) and salts thereof:

$$R'—N(G')\text{-}T\text{-}O—(Y)_x\text{-}T\text{-}N(G)_r\text{-}(B—Z)_q \qquad \text{(Formula 1a)}$$

wherein the variables of Formula (1a) are described herein above.

In one embodiment of the present invention provides a compound with an alkyleneoxy compound with an inorganic acidic polar head group (Z), wherein the compound is defined by Formula (1a) and salts thereof:

$$R'—N(G')\text{-}T\text{-}O—(Y)_x\text{-}T\text{-}N(G)_r\text{-}(B—Z)_q \qquad \text{(Formula 1a)}$$

wherein the variables of Formula (1a) are described herein above.

In one embodiment of the present invention provides a composition comprising a particulate solid, an organic medium, and a compound with an alkyleneoxy compound with an inorganic acidic polar head group (Z), wherein the compound is defined by Formula (1b) and salts thereof:

$$R—O—(Y)_x\text{-}T\text{-}N(G)_r\text{-}(B—Z)_q \qquad \text{(Formula 1b)}$$

wherein the variables of Formula (1b) are described herein above.

In one embodiment of the present invention provides a compound with an alkyleneoxy compound with an inorganic acidic polar head group (Z), wherein the compound is defined by Formula (1b) and salts thereof:

$$R—O—(Y)_x\text{-}T\text{-}N(G)_r\text{-}(B—Z)_q \qquad \text{(Formula 1b)}$$

wherein the variables of Formula (1b) are described herein above, with the proviso that —(Y)$_x$ comprises up to a maximum of 45% of ethyleneoxy groups.

DETAILED DESCRIPTION OF THE INVENTION

The present invention provides dispersants and compositions as described above.

As used herein, the term "(meth) acrylic ester or amide group" means methacrylate, acrylate, methacrylamide, acrylamide, or substituted acrylic or methacrylic ester or amide moieties.

A further variant on the first aspect of the invention is a mixture of compounds of Formula 1 $(U-(Y)_x-T-N(G)_r-(B-Z)_q)$ which contain two or more different groups for at least one of the following variables U, Y, x, T, G, r, B, Z and q. In one embodiment, the mixture of compounds is achieved by having a mixture of compounds derived from 2 or more different U, $(Y)_x$ or T groups. The different groups may be of the same, similar or different hydrophilicity/hydrophobicity depending on the nature of the particulate solid to be dispersed and the nature of the liquid medium.

The inorganic acidic polar head group may be the residue of a sulphur or phosphorus acidic moiety. Examples of a suitable inorganic polar head group include $-SO_3H$, or $-PO_3H_2$, or ester, or salt derivatives thereof. Salts may derived from an alkali metal, (such as sodium or potassium) ammonia, an amine (such as, butyl amine), an alkanolamine (such as, diethanolamine), or quaternary ammonium salt.

When some or all of R or R' are hydrocarbyl groups, the number of carbon atoms on each hydrocarbyl group may be in the range of 1 to 30, or from 1 to 20.

In one embodiment, R or R' are hydrocarbyl groups including aryl, aralkyl, alkaryl, cycloalkyl or alkyl, which may be linear or branched. In one embodiment, the hydrocarbyl group is substituted. In another embodiment, the hydrocarbyl group is unsubstituted.

In one embodiment, R or R' are aryl. Examples of a suitable aryl group include naphthyl or phenyl.

In one embodiment, R or R' are aralkyl. Examples of a suitable aralkyl group include 2-phenylethyl or benzyl.

In one embodiment, R or R' are alkaryl. Examples of a suitable alkaryl group include octyl phenyl or nonyl phenyl.

In one embodiment, R or R' are cycloalkyl. Examples of a suitable cycloalkyl group include a $C_{3-8}$-cycloalkyl, such as, cyclopropyl or cyclohexyl.

In one embodiment, R is an optionally branched alkyl, such as a $C_{1-36}$ optionally branched alkyl. The group R—O— may thus be the residue of an alcohol such as methanol, ethanol, n-propanol, n-butanol, n-hexanol, n-octanol, n-decanol, n-dodecanol, n-tetradecanol, n-hexadecanol, n-octadecanol, isopropanol, isobutanol, tert-butanol, 2-ethylbutanol, 2-ethylhexanol, 3-heptanol, 3,5,5-trimethylhexanol, 3,7-dimethyloctanol and the so-called Guerbet alcohols such as those which are commercially available under the trade name Isofol (ex Condea GmbH) including mixtures thereof. Specific examples of Guerbet alcohols are Isofol 12, 14T, 16, 18T, 18E, 20, 24, 28, 32, 32T and 36.

R in other embodiments may be $C_{1-6}$-alkyl, $C_{1-4}$-alkyl, or methyl.

When R is substituted hydrocarbyl, the substituent may be $C_{1-10}$-alkoxy, carbonyl, sulphonyl, carbamoyl, sulphamoyl, halogen, nitrile, ureido, urethane or ester (i.e., —COO— or —OCO—).

R' may be defined the same or different to R with regard to the number of carbon atoms present on a hydrocarbyl, alkyl group etc. However, R' tends not to be the residue of an alcohol.

In one embodiment, at least one of R, R', G, or G' comprises the residue of an optionally substituted (meth) acrylic ester or amide group, or mixtures thereof. In one embodiment, R' or R comprises the residue of an alkyl (meth)acrylate, or mixtures thereof. In one embodiment, G or G' comprises the residue of an alkyl (meth)acrylate, or mixtures thereof.

In different embodiments, T comprises $C_{3-4}$-alkylene groups, or $-CH_2CH(CH_3)-$ groups, or $-CH_2CH_2CH_2-$ groups. In one embodiment T comprises $-CH_2CH(CH_3)-$.

When Y is $C_{3-4}$-alkyleneoxy, and the chain represented by $(Y)_x$ contains ethyleneoxy ($-CH_2CH_2O-$), the structure of $(Y)_x$ may be random or block.

The chain represented by $(Y)_x$ may contain only one type of $C_{3-4}$-alkyleneoxy repeat unit or it may contain two or more different $C_{3-4}$-alkyleneoxy repeat units. When the chain represented by $(Y)_x$ contains two or more different $C_{3-4}$-alkyleneoxy repeat units, the structure of $(Y)_x$ may be random or block.

In one embodiment, Y is a $C_{3-4}$-alkyleneoxy group, $-CH_2CH_2CH_2CH_2O-$ or $-CH_2CH(CH_3)CH_2O-$ or $-CH_2CH(CH_3)O-$. In another embodiment, Y is a $-CH_2CH_2CH(CH_3)O-$ or $-CH_2-CH(CH_2-CH_3)-O-$. In one embodiment, Y is $C_{3-4}$-alkyleneoxy and the chain represented by $(Y)_x$ is $-CH_2CH_2CH_2CH_2O-$, $-CH_2CH(CH_3)O-$ or $-CH_2-CH(CH_2-CH_3)-O-$.

In one embodiment, the dispersant of Formula (1) comprises $C_{3-4}$-alkyleneoxy (e.g., $-CH_3CH(CH_3)O-$) and may contain a portion of ethyleneoxy repeat units. The ethyleneoxy repeat units in different embodiments may be present on the chain represented by $(Y)_x$ up to a maximum of 45 wt % of the chain, or up to 35 wt % of the chain, or up to 30 wt % of the chain. In one embodiment, no ethyleneoxy repeat units are present on $(Y)_x$.

In other embodiments, the chain $(Y)_x$, may contain at least 50 wt %, or at least 75 wt % of ethyleneoxy repeat units when the compound is required for an aqueous medium, optionally further comprising polar organic liquids.

In one embodiment, the compound of Formula (1) comprises a Y group containing $-CH_2CH(CH_3)O-$ and the chain represented by $(Y)_x$ may contain up to 45% ethyleneoxy repeat units.

In one embodiment, the dispersant of Formula (1) comprises a Y group of $-CH_3CH(CH_3)O-$ and the chain represented by $(Y)_x$ may contain up to 75% ethyleneoxy repeat units.

In one embodiment, Y is a mixture of $C_{3-4}$-alkyleneoxy where the chain represented by $(Y)_x$ is in part $-CH_2CH_2CH_2CH_2O-$, $-CH_2CH(CH_3)O-$ or $-CH_2-CH(CH_2-CH_3)-O-$, with up to 75% ethyleneoxy groups present.

In one embodiment, T comprises $-CH_2CH(CH_3)-$ and Y comprises $-CH_2CH(CH_3)O-$.

In one embodiment, the Formula (1b) is derivable from the residue of the group RO—$(Y)_x$-T-NH—. The group RO—$(Y)_x$-T-NH— typically is the residue of a polyalkyleneoxide monoalkyl ether monoamine. Compounds of this type are commercially available as the Jeffamine™ M-series of monoamines from Huntsman Corporation. Specific examples of Jeffamine™ amines are M-600 (9,0,600), M-1000 (3,18, 1000), M-2005 (32,2,2000) and M-2070 (10, 31, 2000). The figures in parentheses are approximate repeat units of propylene oxide, ethylene oxide and number-average molecular weight respectively.

In one embodiment, the Formula (1a) is derivable from the residue of the group R'—N(G')-T-O—$(Y)_x$-T-N—. The R'—N(G')-T-O—$(Y)_x$-T-N— is typically the residue of a polyalkyleneoxide diamine. Compounds of this type are commercially available as the Jeffamine™ D or ED-series of diamines from Huntsman Corporation. Specific examples of Jeffamine™ diamines are D-230 (3,0,230), D-400 (6,0,400), D-2000 (33,0,2000), D-4000 (68,0,4000), ED-600 (3.6,9,600), ED-900 (2.5,15.5,900) and ED2003 (6,39,2000). The figures in parentheses are approximate repeat units of propylene oxide, ethylene oxide and number-average molecular weight respectively.

The particulate solid present in the composition may be any inorganic or organic solid material which is substantially insoluble in the organic medium. In one embodiment, the particulate solid is a pigment.

Examples of suitable solids are pigments for solvent inks; inorganic pigments, extenders and fillers for paints and plastics materials (such as, thermosetting composites); disperse dyes; optical brightening agents and textile auxiliaries for solvent dyebaths, inks and other solvent application systems; solids for oil-based and inverse-emulsion drilling muds; dirt and solid particles in dry cleaning fluids; particulate ceramic materials; magnetic materials and magnetic recording media; fibres such as glass, steel, carbon and boron for composite materials.

In one embodiment, the solid is an organic pigment from any of the recognised classes of pigments described, for example, in the Third Edition of the Colour Index (1971) and subsequent revisions of, and supplements thereto, under the chapter headed "Pigments". Examples of organic pigments are those from the likes of acid, basic and mordant dyes, and carbon black.

Inorganic solids include: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g., gamma-$Fe_2O_3$, $Fe_3O_4$, and cobalt-doped iron oxides, calcium oxide, ferrites, especially barium ferrites; and metal particles, especially metallic iron, nickel, cobalt, copper and alloys thereof.

The organic medium present in the composition of the invention in one embodiment is a plastics material and in another embodiment an organic liquid. The organic liquid may be a non-polar or a polar organic liquid, although a polar organic liquid is typically used. By the term "polar" in relation to the organic liquid it is meant that an organic liquid is capable of forming moderate to strong bonds as described in the article entitled "A Three Dimensional Approach to Solubility" by Crowley et al in Journal of Paint Technology, Vol. 38, 1966, at page 269. Such organic liquids generally have a hydrogen bonding number of 5 or more as defined in the abovementioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein.

In one embodiment, polar organic liquids are dialkyl ketones, alkyl esters of alkane carboxylic acids and alkanols, especially such liquids containing up to, and including, a total of 6 carbon atoms. As examples of the polar organic liquids include dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran. In one embodiment solvents are alkanols, alkane carboxylic acids and esters of alkane carboxylic acids.

Examples of organic liquids, which may be used as polar organic liquids are film-forming resins such as, are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of paint resins include short oil alkyd/melamine-formaldehyde, polyester/melamine-formaldehyde, thermosetting acrylic/melamine-formaldehyde, long oil alkyd, polyether polyols and multi-media resins such as acrylic and urea/aldehyde.

The organic liquid may be a polyol, that is to say, an organic liquid with two or more hydroxy groups. In one embodiment, polyols include alpha-omega diols or alpha-omega diol ethoxylates.

In one embodiment, non-polar organic liquids are compounds containing aliphatic groups, aromatic groups or mixtures thereof. The non-polar organic liquids include non-halogenated aromatic hydrocarbons (e.g., toluene and xylene), halogenated aromatic hydrocarbons (e.g., chlorobenzene, dichlorobenzene, chlorotoluene), non-halogenated aliphatic hydrocarbons (e.g., linear and branched aliphatic hydrocarbons containing six or more carbon atoms both fully and partially saturated), halogenated aliphatic hydrocarbons (e.g., dichloromethane, carbon tetrachloride, chloroform, trichloroethane) and natural non-polar organics (e.g., vegetable oil, sunflower oil, linseed oil, terpenes and glycerides).

In one embodiment, the organic liquid comprises at least 0.1% by weight, or 1% by weight or more of a polar organic liquid based on the total organic liquid.

The organic liquid optionally further comprises water. In one embodiment, the organic liquid is free of water.

When the organic liquid contains water the amount present in one embodiment is not greater than 70%, or not greater than 50%, or not greater than 40% by weight based on the amount of organic liquid.

The plastics material may be a thermoset resin or a thermoplastic resin. The thermosetting resins useful in this invention include resins which undergo a chemical reaction when heated, catalysed, or subject to UV radiation and become relatively infusible. Typical reactions in thermosetting resins include oxidation of unsaturated double bonds, reactions involving epoxy/amine, epoxy/carbonyl, epoxy/hydroxyl, polyisocyanate/hydroxy, amino resin/hydroxy moieties, free radical reactions or polyacrylate, cationic polymerization or epoxy resins and vinyl ether, condensation of silanol, etc.

Polymers with hydroxy functionality (frequently polyols) are widely used in thermosetting system to crosslink with amino resins or polyisocyanates. The polyols include acrylic polyols, alkyd polyols, polyester polyols, polyether polyols and polyurethane polyols. Typical amino resins include melamine formaldehyde resins, benzoguanamine formaldehyde resins, urea formaldehyde resins and glycoluril formaldehyde resins. Polyisocyanates are resins with two or more isocyanate groups, including both monomeric aliphatic diisocyanates, monomeric aromatic diisocyanates and their polymers. Typical aliphatic diisocyanates include hexamethylene diisocyanate, isophorone diisocyanate and hydrogenated diphenylmethane diisocyanate. Typical aromatic isocyanates include toluene diisocyanates and biphenylmethane diisocyanates.

In one embodiment, thermoplastic resins include polyolefins, polyesters, polyamides, polycarbonates, polyurethanes, polystyrenics, poly(meth)acrylates (such as, polymethacrylates), celluloses and cellulose derivatives. Said compositions may be prepared in a number of ways but melt mixing and dry solid blending are typical methods.

If desired, the compositions may contain other ingredients, for example, resins (where these do not already constitute the organic medium), binders, fluidising agents anti-sedimentation agents, plasticisers, surfactants, anti-foamers, rheology modifiers, levelling agents, gloss modifiers and preservatives.

The compositions typically contain from 1 to 95% by weight of the particulate solid, the precise quantity depending on the nature of the solid and the quantity depending on the nature of the solid and the relative densities of the solid and the polar organic liquid. For example, a composition in which the solid is an organic material, such as an organic pigment, in one embodiment contains from 15 to 60% by weight of the solid whereas a composition in which the solid is an inorganic material, such as an inorganic pigment, filler or extender, in one embodiment contains from 40 to 90% by weight of the solid based on the total weight of composition.

The composition may be prepared by any of the conventional methods known for preparing dispersions. Thus, the solid, the organic medium and the dispersant may be mixed in any order, the mixture then being subjected to a mechanical treatment to reduce the particles of the solid to an appropriate size, for example, by ball milling, bead milling, gravel milling or plastic milling until the dispersion is formed. Alternatively, the solid may be treated to reduce its particle size independently or in admixture with either the organic medium or the dispersant, the other ingredient or ingredients then being added and the mixture being agitated to provide the composition.

The composition of the present invention is particularly suited to liquid dispersions. In one embodiment, such dispersion compositions comprise:
(a) from 0.5 to 30 parts of a particulate solid;
(b) from 0.5 to 30 parts of a dispersant of Formula (1) (or (1a) or (1b)); and
(c) from 40 to 99 parts of an organic liquid; wherein all parts are by weight and the amounts (a)+(b)+(c)=100.

In one embodiment, component a) comprises from 0.5 to 30 parts of a pigment and such dispersions are useful as liquid inks, paints and mill-bases.

If a composition is required comprising a particulate solid and a dispersant of Formula (1) in dry form, the organic liquid is typically volatile so that it may be readily removed from the particulate solid by a simple separation means such as evaporation. In one embodiment, the composition comprises the organic liquid.

If the dry composition consists essentially of the dispersant of Formula (1) and the particulate solid, it typically contains at least 0.2%, at least 0.5% or at least 1.0% dispersant of Formula (1) based on weight of the particulate solid. In one embodiment, the dry composition contains not greater than 99.9%, not greater than 50%, not greater than 20% or not greater than 10% by weight of dispersant of Formula (1) based on the weight of the particulate solid.

As disclosed hereinbefore, the compositions of the invention are suitable for preparing mill-bases wherein the particulate solid is milled in an organic liquid in the presence of a compound for Formula (1) and salts thereof.

Thus, according to a still further aspect of the invention there is provided a mill-base comprising a particulate solid, an organic liquid and a dispersant of Formula (1) and salts thereof.

Typically, the mill-base contains from 20 to 70% by weight particulate solid based on the total weight of the mill-base. In one embodiment, the particulate solid is not less than 10 or not less than 20% by weight of the mill-base. Such mill-bases may optionally contain a binder added either before or after milling.

The binder is a polymeric material capable of binding the composition on volatilisation of the organic liquid.

Binders are polymeric materials including natural and synthetic materials. In one embodiment, binders include poly(meth)acrylates, polystyrenics, polyesters, polyurethanes, alkyds, polysaccharides such as cellulose, and natural proteins such as casein. In one embodiment, the binder is present in the composition at more than 100% based on the amount of particulate solid, more than 200%, more than 300% or more than 400%.

The amount of optional binder in the mill-base can vary over wide limits but is typically not less than 10%, and often not less than 20% by weight of the continuous/liquid phase of the mill-base. In one embodiment, the amount of binder is not greater than 50% or not greater than 40% by weight of the continuous/liquid phase of the mill-base.

The amount of dispersant in the mill-base is dependent on the amount of particulate solid but is typically from 0.5 to 5% by weight of the mill-base.

Dispersions and mill-bases made from the composition of the invention are particularly suitable for use in coatings and paints, especially high solids paints; inks, especially flexographic, gravure and screen inks; non-aqueous ceramic processes, especially tape-coating, doctor-blade, extrusion and injection moulding type processes; composites, cosmetics, adhesives and plastics materials.

Thus, according to a further aspect of the present invention, there is provided a paint or ink comprising a particulate solid, an organic liquid, a binder and a dispersant of Formula (1) and salts thereof.

As noted hereinbefore, many of the dispersants of Formula (1) are novel.

In one embodiment, the compound of Formula (1) (or (1a), or (1b)) is used to disperse inorganic pigments and fillers, such as, $TiO_2$, iron oxide, carbon black and ATH (aluminium trihydrate) in at least one of the following: solvent based paints, ink systems, thermoset systems and thermoplastic systems.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined.

The invention is further illustrated by the following examples wherein all references to amounts are in parts by weight unless indicated to the contrary.

EXAMPLES

Dispersant 1

A polyether amine consisting of C12-15 alcohol reacted butylene oxide (MW 1700) 80% active (200 g 78 mmols) is stirred with ethanol 74OP (75 ml) at room temperature and phosphorous acid (12.75 g 155 mmols) is added followed by conc. HCl (7 ml). The mixture is heated to 130° C. for to allow the phosphorous acid to dissolve. A 37% aqueous solution of formaldehyde (55 g, 682 mmols) is added dropwise over 1 hour to the stirred mixture at reflux. The mixture is stirred at reflux for 16 hours and then the solvents are removed by distillation at 150° C. and collection over a Dean stark apparatus. Once the solvent is removed, the mixture is cooled to 50° C. and a further amount of ethanol 74OP (50 ml) added. The solvent is removed from the stirred mixture at 100° C. This process is repeated to give an amber liquid (215 g) upon cooling.

Dispersant 2

A polyether amine consisting of C12-15 alcohol reacted propylene oxide (MW 1660) 85% active (200 g 92 mmols) is stirred with ethanol 74OP (120 ml) at room temperature with phosphorous acid (15.02 g 183 mmols) and then conc. HCl (7.5 ml) is added. The mixture is heated to 130° C. to allow the phosphorous acid to dissolve. A 37% aqueous solution of formaldehyde (55 g, 682 mmols) is added dropwise over 1 hour to the stirred mixture at reflux. The mixture is stirred at reflux for 16 hours and then the solvents are removed by distillation at 150° C. and collection over a Dean stark apparatus. Once the solvent had been removed, the mixture is cooled to 50° C. and a further amount of ethanol 74OP (50 ml) is added. The solvent is removed from the stirred mixture at 100° C. This process is repeated once more to give an amber liquid (217 g) upon cooling.

Dispersant 3

Jeffamine M2005 (MW2000) (200 g 100 mmols) is stirred with ethanol 74OP (120 ml) at room temperature, phosphorous acid (16.4 g, 200 mmols) is added followed by conc. HCl (9 ml). The mixture is heated to 130° C. to allow the phosphorous to dissolve. A 37% aqueous solution of formaldehyde (55 g, 682 mmols) is added dropwise over 1 hour to the stirred mixture at reflux. The mixture is stirred at reflux for 16 hours and then the solvents are removed by distillation at 150° C. and collection over a Dean stark apparatus. Once the solvent is removed, the mixture is cooled to 50° C. and a further amount of ethanol 74OP (50 ml) is added. The solvent is removed from the stirred mixture at 100° C. This process is repeated once more to give an amber liquid (219 g) upon cooling.

Dispersant 4

Jeffamine M600 (MW600) (200 g 78 mmols) is stirred with ethanol 74OP (75 ml) at room temperature and phosphorous acid (12.75 g 155 mmols) is added followed by conc. HCl (7 ml). The mixture is heated to 130° C. whilst the phosphorous acid dissolves. A 37% aqueous solution of formaldehyde (55 g 682 mmols) is added dropwise over 1 hour to the stirred mixture at reflux. The mixture is stirred at reflux for 16 hours and then the solvents are removed by distillation at 150° C. and collection over a Dean stark apparatus. Once the solvent is removed, the mixture is cooled to 50° C. and a further amount of ethanol 74OP (50 ml) is added. The solvent is removed from the stirred mixture at 100° C. This process is repeated once more to give an amber liquid (215 g) upon cooling.

Dispersant 5

Jeffamine M1000 (MW1000) (39.63 g 39 mmols) is stirred with water (15 ml) at room temperature and phosphorous acid (6.5 g 79 mmols), followed by adding conc. HCl (7 ml). The mixture is heated to 130° C. whilst the phosphorous acid dissolves. A 37% aqueous solution of formaldehyde (22 g 271 mmols) is added dropwise over 1 hour to the stirred mixture at reflux. The mixture is stirred at reflux for 16 hours and then the solvents are removed by distillation at 150° C. and collection over a Dean stark apparatus. Once the solvent is removed, the mixture is cooled to 50° C. and a further amount of ethanol 74OP (50 ml) is added. The solvent is removed from the stirred mixture at 100° C. This process was repeated once more to give a beige wax (38 g) upon cooling.

Dispersant 6

Jeffamine M3003 (MW3000) (59.5 g 20 mmols) is stirred with water (7.5 ml) at room temperature and phosphorous acid (3.25 g 40 mmols) followed the addition of conc. HCl (7.5 ml). The mixture is heated to 130° C. to allow the phosphorous acid to dissolve. A 37% aqueous solution of formaldehyde (11 g 136 mmols) is added dropwise over 1 hour to the stirred mixture at reflux. The mixture is stirred at reflux for 16 hours and then the solvents are removed by distillation at 150° C. and collection over a Dean stark apparatus. Once the solvent are removed, the mixture is cooled to 50° C. and a further amount of ethanol 74OP (50 ml) is added. The solvent is removed from the stirred mixture at 100° C. This process is repeated once more to give a cream wax (60 g) upon cooling.

Dispersant 7

Jeffamine D2000 (MW2000) (79.27 g 39 mmols) is stirred with water (15 ml) at room temperature and phosphorous acid (6.5 g, 79 mmols) followed by the addition of conc. HCl (7 ml). The mixture is heated to 130° C. to enable the phosphorous acid to dissolve. A 37% aqueous solution of formaldehyde (22 g, 271 mmols) is added dropwise over 1 hour to the stirred mixture at reflux. The mixture is stirred at reflux for 16 hours and then the solvent is removed by distillation at 150° C. and collection over a Dean stark apparatus. Once the solvent is removed, the mixture is cooled to 50° C. and a further amount of ethanol 74OP (50 ml) is added. The solvent is removed from the stirred mixture at 100° C. This process is repeated once more to give a brown gum (77 g) upon cooling.

Dispersant 8

Jeffamine D2000 (MW2000) (39.63 g 19.8 mmols) is stirred with water (15 ml) at room temperature and phosphorous acid (6.5 g 79 mmols) followed by the addition of conc. HCl (7 ml). The mixture is heated to 130° C. whilst the phosphorous acid dissolves. A 37% aqueous solution of formaldehyde (22 g 271 mmols) is added dropwise over 1 hour to the stirred mixture at reflux. The mixture is stirred at reflux for 16 hours and then the solvent is removed by distillation at 150° C. and collection over a Dean stark apparatus. Once the solvent is removed, the mixture is cooled to 50° C. and a further amount of ethanol 74OP (50 ml) is added. The solvent is removed from the stirred mixture at 100° C. This process is repeated once more to give a golden gum (30 g) upon cooling.

Dispersant 9

Jeffamine D4000 (MW4000) (79.27 g 19.8 mmols) is stirred with water (6.5 ml) at room temperature and phosphorous acid (3.25 g, 38 mmols) followed by the addition of conc. HCl (3.5 ml). The mixture is heated to 130° C. whilst the phosphorous acid dissolves. A 37% aqueous solution of formaldehyde (11 g, 135 mmols) is added dropwise over 1 hour to the stirred mixture at reflux. The mixture is stirred at reflux for 16 hours and then the solvents are removed by distillation at 150° C. and collection over a Dean stark apparatus. Once the solvent is removed, the mixture is cooled to 50° C. and a further amount of ethanol 74OP (50 ml) is added. The solvent is removed from the stirred mixture at 100° C. This process is repeated once more to give a golden gum (72 g) upon cooling.

Dispersant 10

Jeffamine D4000 (MW4000) (79.27 g, 19.8 mols) is stirred with water (10 ml) at room temperature and phosphorous acid (6.5 g 79 mmols) followed by the addition of conc. HCl (7 ml). The mixture is heated to 130° C. whilst the phosphorous acid dissolves. A 37% aqueous solution of formaldehyde (22 g, 271 mmols) is added dropwise over 1 hour to the stirred mixture at reflux. The mixture is stirred at reflux for 16 hours and then the solvents are removed by distillation at 150° C. and collection over a Dean stark apparatus. Once the solvent is removed, the mixture is cooled to 50° C. and a further amount of ethanol 74OP (50 ml) is added. The solvent is removed from the stirred mixture at 100° C. This process is repeated once more to give a pale yellow gum (69 g) upon cooling.

Dispersant 11

Jeffamine ED2001 (MW2000) (39.65 g, 19.8 mmols) is stirred with water (15 ml) at room temperature and phosphorous acid (6.5 g, 79 mmols) followed by the addition of conc. HCl (7 ml). The mixture is heated to 130° C. whilst the phosphorous acid dissolves. A 37% aqueous solution of formaldehyde (22 g, 271 mmols) is added dropwise over 1 hour to the stirred mixture at reflux. The mixture is stirred at reflux for 16 hours and then the solvents are removed by distillation at 150° C. and collection over a Dean stark apparatus. Once the solvent is removed, the mixture is cooled to 50° C. and a further amount of ethanol 74OP (50 ml) is added. The solvent is removed from the stirred mixture at 100° C. This process is repeated once more to give a brown wax (41 g) upon cooling.

Dispersant 12

Jeffamine M2070 (MW2000) (200 g, 100 mmols) is stirred with ethanol 74OP (100 ml) at room temperature and phosphorous acid (16.4 g, 200 mmols) followed by the addition of conc. HCl (17 ml). The mixture is heated to 130° C. whilst the phosphorous acid dissolves. A 37% aqueous solution of formaldehyde (55 g, 677 mmols) is added dropwise over 1 hour to the stirred mixture at reflux. The mixture is stirred at reflux for 16 hours and then the solvents are removed by distillation at 150° C. and collection over a Dean stark apparatus. Once the solvent is removed, the mixture is cooled to 50° C. and a further amount of ethanol 74OP (100 ml) is added. The solvent is removed from the stirred mixture at 100° C. This process is repeated once more to give an amber liquid (220 g) upon cooling.

Preparation of Mill-Bases

A series of titanium dioxide (7.5 g of Tioxide TR 92 (ex Huntsman)) mill-bases are prepared utilising Examples 1 to 12 and Comparative Example 1 with no agent. The mill-bases are prepared by dissolving the compounds of Examples 1-12 (0.2 g) in a solvent mixture of 2.3 g of MPA:Butanol in the ratio of 4:1 (MPA=methoxypropylacetate). Glass beads are added and the mixture is shaken on a horizontal shaker for 16 hours. The resulting dispersions are then assessed for fluidity using an arbitrary scale of A to E (good to bad). The milling grade obtained for each example is given in Table 1.

TABLE 1

| Dispersant Example | Milling Grade |
|---|---|
| 1 | A/B |
| 2 | A |
| 3 | A |
| 4 | A/B |
| 5 | C/D |
| 6 | C/D |

TABLE 1-continued

| Dispersant Example | Milling Grade |
|---|---|
| 7 | A/B |
| 8 | B/C |
| 9 | B |
| 10 | B/C |
| 11 | A/B |
| 12 | A |
| Comparative 1 | E |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composition comprising a particulate solid, an organic medium and a compound with an alkyleneoxy compound with an inorganic acidic polar head group (Z), wherein the compound is defined by Formula (I) and salts thereof:

$$U\text{---}(Y)_x\text{-T-N}(G)_r\text{---}(B\text{---}Z)_q \quad \text{(Formula 1)}$$

wherein

U is independently R'—N-(G')-T'-O—, or R—O—;

R or R' may be the same or different and are independently H or $C_{1-50}$-optionally substituted hydrocarbyl, or hydrocarbonyl group (acyl group), or the residue of an epoxide, or the residue of an optionally substituted (meth) acrylic ester or amide group;

Y is $C_{2-4}$-alkyleneoxy;

T or T' is independently $C_{2-4}$ alkylene;

B is a methylene group;

Z is an inorganic acidic polar head group, such as, a sulphur or phosphorous acidic polar head group;

G and G' may be the same or different and are independently H or $C_{1-50}$-optionally substituted hydrocarbyl or $C_{1-50}$-optionally substituted hydrocarbyl or hydrocarbonyl group or the residue of an epoxide, or the residue of an optionally substituted (meth) acrylic ester or amide group;

r is zero or 1;

q is 1 or 2, with the proviso that when q is 2, r is zero; and x is from 2 to 90 wherein said organic medium is an organic liquid free of water or a plastics material.

2. The composition of claim 1, wherein Z of Formula (1) is a residue of an inorganic acidic polar head group of a sulphur or phosphorus acidic moiety.

3. The composition of claim 2, wherein the sulphur or phosphorus acidic moiety comprises —$SO_3H$ or —$PO_3H_2$, or ester, or salt derivatives thereof.

4. The composition of claim 1, wherein Y is a mixture of $C_{3-4}$-alkyleneoxy where the chain represented by $(Y)_x$ is in part —$CH_2CH_2CH_2CH_2O$—, —$CH_2CH(CH_3)O$— or —$CH_2$—$CH(CH_2$—$CH_3)$—O—, with up to 75% ethyleneoxy groups present.

5. The composition as claimed in claim 1 wherein the organic liquid comprises at least 0.1% by weight of a polar organic liquid based on the total organic liquid.

6. The composition as claimed in claim 1 wherein the particulate solid is a pigment.

* * * * *